B. M. HANNA.
EYEGLASSES.
APPLICATION FILED JAN. 29, 1914.
1,102,909.
Patented July 7, 1914.
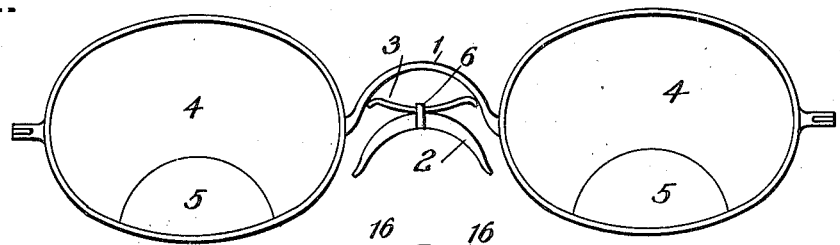
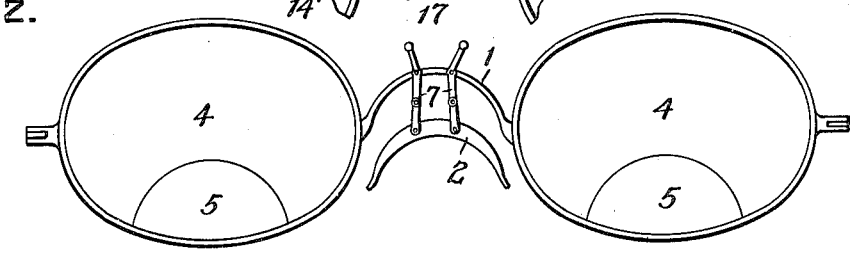
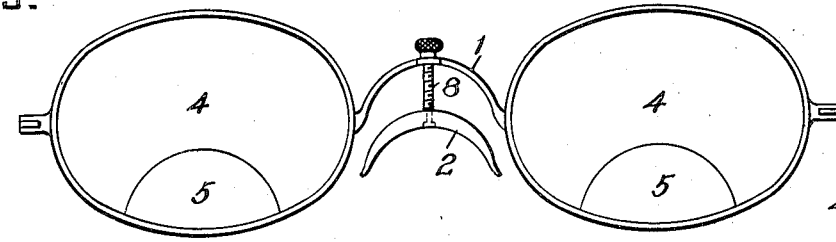
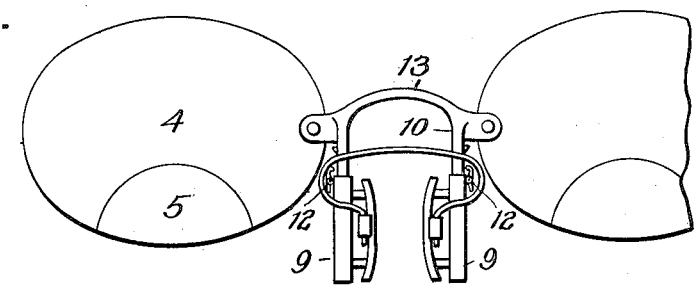
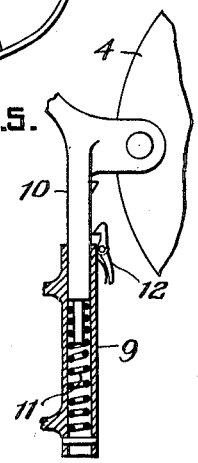
WITNESSES:
Paul N. Critchlow
Thomas J. Thomasson.
INVENTOR
Benjamin M. Hanna
by Christy and Christy
Attys

UNITED STATES PATENT OFFICE.

BENJAMIN M. HANNA, OF PITTSBURGH, PENNSYLVANIA.

EYEGLASSES.

1,102,909. Specification of Letters Patent. Patented July 7, 1914.

Application filed January 29, 1914. Serial No. 815,126.

*To all whom it may concern:*

Be it known that I, BENJAMIN M. HANNA, residing at Pittsburgh, in the county of Allegheny and State of Pennsylvania, a citizen of the United States, have invented or discovered certain new and useful Improvements in Eyeglasses, of which improvements the following is a specification.

My invention relates to bi-focal eyeglasses, and the object of my invention is to render such glasses more adaptable in service.

Bi-focal eyeglasses are formed with a main lens body for distant vision and a smaller attached lens for near vision. This reading lens, for near vision, is ordinarily applied to or formed in the lower portion of the glass considered as a whole and the wearer in using this portion of the glass turns his eyes downward, as is natural to one reading a book held in his hands. There are many persons for whom the muscular effort of turning the eye downward is either impossible, or painful, or difficult, and it is for such persons, under the necessity of using eyeglasses of different power for distant and for near vision, that my present invention is primarily intended.

The invention consists in an attachment to a pair of eyeglasses by which the glasses, when in position upon the nose of the wearer, may be thrown to alternate positions, so that in level vision—that is without the muscular turning of the eye downward—the wearer may use alternately the distance lens or the reading lens.

The invention is illustrated in the accompanying drawings, in which—

Figures 1, 2, and 3 show each in elevation a pair of spectacles with my invention in alternate forms applied thereto, and Fig. 4 shows in elevation a pair of nose-glasses in which also the invention is present. Fig. 5 is a detail showing parts of the structure of Fig. 4 in elevation and in section. Fig. 6 illustrates a variant on the type shown in Fig. 1.

Referring first to Fig. 1, to the nose-piece 1 of a pair of spectacles of ordinary form is secured an ancillary nose-rest 2. These two parts are connected one to the other by a spring—in this case a strap-spring 3—which may collapse and allow the parts 1 and 2 to come into close alinement one with the other, and may also spring to the extended position shown and so bring the parts 1 and 2' into relatively distended position. When the parts 1 and 2 are in relatively collapsed position the wearer will in level vision be using the distance lens 4; when these parts are in the extended position shown, he will in level vision be using the reading lens 5. A catch 6 is provided, adapted when the parts 1 and 2 are collapsed and brought into close alinement to hold the parts in such relative position against the tension of the spring, but capable of being released by the fingers of the wearer (and preferably while the spectacles are in position on his nose) so that, in response to the tension of the spring 6, the parts will be extended.

Fig. 2 shows, in place of a spring, a toggle connection 7, of the parts 1 and 2. This toggle may, as will readily be understood be swung manually—and preferably without removal of the glasses when in place on the wearer's nose—to effect the ends already indicated.

Fig. 3 shows, in place of spring or toggle, a manually operated screw 8, serving the same general purpose and for the same ends. These three instances are not intended to be exhaustive of the possibilities of attachment of parts 1 and 2 so as to permit of the desired adjustment to alternate positions; they are intended merely to indicate that variety in expedients is contemplated as incident to the utilizing of my invention.

In Fig. 4 I have indicated that my invention may be applied to nose-glasses as distinguished from spectacles. In this case two guides 9 are secured to the nose-piece, and the two glasses are attached to two rods 10 which slide vertically in guides 9. It will be understood that the addition of springs within the guides 9 and engaging the rods 10 may be the effective means of extending the structure and that catches may be provided to hold the structure collapsed against the tension of such springs. This is indicated in detail in Fig. 5, wherein the spring is indicated at 11 and the catch at 12. It will be understood that Figs. 4 and 5 are merely illustrative of one way of applying the invention to nose-glasses. The two rods 10 may be connected as by a bridge-piece 13, that they shall work in unison.

Fig. 6 is a fragmentary view, illustrating variation in the type shown in Fig. 1. The strap-spring 3 of Fig. 1 is here replaced by two spiral springs 14, borne by suitably disposed portions of the frame of the spectacles. These springs hold two arms 15 in the position shown, from which position they may be swung against the tension of the spring to be held by the catches 16. The catches may be opened by the fingers of the wearer to release the arms 15. On the ends of the arms 15 are the pieces 17 which when the arms 15 are in the position shown rest against the nose of the wearer and sustain the structure.

I claim as my invention:

1. In a pair of eyeglasses the combination of a bi-focal lens and an expansible and contractible support, such support in its alternate positions sustaining the said lens when in use with its alternate lens areas in line with the eye of the wearer.

2. A pair of bi-focal eyeglasses provided with an expansible and contractible nose-piece, such support in its alternate positions sustaining the glasses when in use with their alternate lens-areas in line with the eyes of the wearer, means for holding the nose-piece normally in expanded position, and a manually operable catch for holding said nose-piece in contracted position.

3. In a pair of spectacles the combination of a frame, a bi-focal lens carried in said frame and a nose-rest movable vertically with respect to said frame to alternate positions in which when the spectacles are in use the alternate lens areas are in line with the eye of the wearer.

In testimony whereof I have hereunto set my hand.

BENJAMIN M. HANNA.

Witnesses:
BAYARD H. CHRISTY,
FRANCIS J. TOMASSON.